United States Patent
Viswanathan et al.

(10) Patent No.: US 12,469,600 B2
(45) Date of Patent: Nov. 11, 2025

(54) UV EXPOSURE MONITORING AND ALERTS APPLICATION

(71) Applicants: Shriya Viswanathan, Plano, TX (US); Saura Agarwal, Plano, TX (US)

(72) Inventors: Shriya Viswanathan, Plano, TX (US); Saura Agarwal, Plano, TX (US)

( * ) Notice: Subject to any disclaimer, the term of this patent is extended or adjusted under 35 U.S.C. 154(b) by 0 days.

(21) Appl. No.: 18/199,367

(22) Filed: May 19, 2023

(65) Prior Publication Data

US 2024/0120088 A1 Apr. 11, 2024

Related U.S. Application Data

(60) Provisional application No. 63/347,548, filed on May 31, 2022.

(51) Int. Cl.
| | |
|---|---|
| *G06F 3/048* | (2013.01) |
| *G08B 21/18* | (2006.01) |
| *G16H 40/67* | (2018.01) |
| *G06F 3/04842* | (2022.01) |

(52) U.S. Cl.
CPC ............ *G16H 40/67* (2018.01); *G08B 21/18* (2013.01); *G06F 3/04842* (2013.01)

(58) Field of Classification Search
CPC ...... G16H 40/67; G08B 21/18; G06F 3/04842
See application file for complete search history.

(56) References Cited

U.S. PATENT DOCUMENTS

| | | | | |
|---|---|---|---|---|
| 10,132,680 | B1 * | 11/2018 | Isikman .................... | G01J 1/18 |
| 10,561,376 | B1 * | 2/2020 | Kahn ....................... | G01J 1/429 |
| 11,118,968 | B1 * | 9/2021 | Lian ......................... | G01T 1/02 |
| 2003/0150998 | A1 * | 8/2003 | Shin ........................ | G01J 1/429 |
| | | | | 250/372 |
| 2008/0265170 | A1 * | 10/2008 | Ales ........................ | G01J 1/0219 |
| | | | | 340/600 |
| 2011/0191272 | A1 * | 8/2011 | McGuire ................ | G01J 1/0219 |
| | | | | 706/11 |
| 2015/0102208 | A1 * | 4/2015 | Appelboom ........... | G01J 1/4204 |
| | | | | 250/208.2 |
| 2017/0191866 | A1 * | 7/2017 | Balooch .................. | G01J 1/029 |
| 2017/0350754 | A1 * | 12/2017 | Brown ..................... | G08B 5/38 |
| 2018/0249944 | A1 * | 9/2018 | Poutiatine ............... | G01J 1/429 |
| 2019/0060678 | A1 * | 2/2019 | Poutiatine .............. | A61Q 17/04 |
| 2021/0364350 | A1 * | 11/2021 | Matthys ................. | H04B 1/385 |

\* cited by examiner

*Primary Examiner* — Mahelet Shiberou (57) ABSTRACT

In one aspect, a computerized system comprising: a user-interface configured to: display a skin color selection, wherein the skin color selection comprises a plurality of skin pigments, receive a user skin color selection, display a skin cancer familial history input field, receive a skin cancer familial history input value, display a sun protection factor (SPF) input field, receive a SPF sunscreen input value selection for sunscreen being used; a sun exposure monitoring application operating in the computer system configured to: translate the skin color selection to a maxim sun exposure value, and computer a maximum sun exposure time using the user skin color selection, the skin cancer familial history input value, and the SPF selection for a sunscreen being used, monitor a sun exposure of the computer system, implement an alert signal when the maximum sun exposure time is reached.

5 Claims, 11 Drawing Sheets

Genetic information

How many parents or grandparents do you have with a history of skin cancer?

[ 1 Parent ]

[ 2 Parents ]

[ Maternal Grandparent(s) ]

[ Paternal Grandparent(s) ]

[ None / Unknown ]

← Back        Next →

| Table (1) of Variables: Skin color Factors | | |
|---|---|---|
| Option Selected | Factor of change | Maxexposure Value after selecting skin color option |
| 1 | 1.01 | 9090 |
| 2 | 1.02 | 9180 |
| 3 | 1.03 | 9270 |
| 4 | 1.04 | 9360 |
| 5 | 1.05 | 9450 |
| 6 | 1.06 | 9540 |
| 7 | 1.07 | 9630 |
| 8 | 1.08 | 9720 |
| 9 | 1.09 | 9810 |
| 10 | 1.1 | 9900 |
| 11 | 1.11 | 9990 |
| 12 | 1.12 | 10080 |
| 13 | 1.13 | 10170 |

| Table (2) of Variables: Genetic History Factors | |
|---|---|
| Option Selected | Factor of change |
| Father | 0.9 |
| Mother | 0.9 |
| Maternal Grandparents | 0.9 |
| Paternal Grandparents | 0.9 |
| None | 1 |
| 2 options selected | 0.81 |
| 3 options selected | 0.729 |
| 4 options selected | 0.6561 |

FIGURE 10

| Table (3) of Variables: SPF | |
| --- | --- |
| Option Selected | Factor of change |
| None | 1 |
| SPF 15 | 15 |
| SPF 30 | 30 |
| SPF 50 | 50 |
| SPF 100 | 100 |

FIGURE 11

UV EXPOSURE MONITORING AND ALERTS APPLICATION

CLAIM OF PRIORITY

This application claims priority to U.S. Provisional Patent Application No. 63/347,548, filed on 31 May 2022 and titled System, Method, and Wearable Apparatus for determining and notification of total UV exposure. The provisional application is hereby incorporated by reference in its entirety.

BACKGROUND

It is noted that ultraviolet (UV) light from the sun cannot be seen or felt like infrared or radiant light. It has the ability to cause harm to all humans and animals who are exposed to such light. About 3.3 million Americans suffer from skin cancer caused by UV light signifying that everyone is at risk from UV. In addition to cancer, UV exposure can also cause short term skin problems such as burns, rashes, and irritation. Financially, UV caused issues are not cheap, with about 4.8 billion dollars being spent annually in the U.S. alone. Harm is directly proportional to UV exposure time, which is not a well-known variable. The UV index does not give any idea if you can go out, do activities, or work. There is no practical way to track overall exposure and alert someone to seek safety.

SUMMARY OF THE INVENTION

In one aspect, a computerized system comprising: a user-interface configured to: display a skin color selection, wherein the skin color selection comprises a plurality of skin pigments, receive a user skin color selection, display a skin cancer familial history input field, receive a skin cancer familial history input value, display a sun protection factor (SPF) input field, receive a SPF sunscreen input value selection for sunscreen being used; a sun exposure monitoring application operating in the computer system configured to: translate the skin color selection to a maxim sun exposure value, and computer a maximum sun exposure time using the user skin color selection, the skin cancer familial history input value, and the SPF selection for a sunscreen being used, monitor a sun exposure of the computer system, implement an alert signal when the maximum sun exposure time is reached.

BRIEF DESCRIPTION OF THE DRAWINGS

The Figures described above are a representative set and are not exhaustive with respect to embodying the invention.

DESCRIPTION

Disclosed are a system, method, and article of manufacture for UV exposure monitoring and alerts application. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment;' 'an embodiment;' 'one example,' or similar language means that a particular feature, structure, or characteristic described in connection with the embodiment is included in at least one embodiment of the present invention. Thus, appearances of the phrases 'in one embodiment;' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Definitions

Example definitions for some embodiments are now provided.

Application programming interface (API) is a set of subroutine definitions, communication protocols, and/or tools for building software. An API can be a set of clearly defined methods of communication among various components.

Application-specific integrated circuit (ASIC) is an integrated circuit (IC) chip customized for a particular use.

Arduino is an open-source hardware and software company, project, and user community that designs and manufactures single-board microcontrollers and microcontroller kits for building digital devices. Arduino Uno is an open-source microcontroller board based on the Microchip ATmega328P microcontroller.

Bluetooth is a short-range wireless technology standard that is used for exchanging data between fixed and mobile devices over short distances and building personal area networks (PANS). In the most widely used mode, transmission power is limited to 2.5 milliwatts, giving it a very short range of up to 10 meters (33 ft). It employs UHF radio waves in the ISM bands, from 2.402 GHz to 2.48 GHz. It is noted that in other examples, other short-range wireless systems/protocols can be utilized to transfer of information between two or more points without the use of an electrical conductor, optical fiber or other continuous guided medium for the transfer.

Internet of things (IoT)/Industrial Internet of Things (IIoT) describes the network of physical objects that are embedded with sensors, software, and other technologies for the purpose of connecting and exchanging data with other devices and systems over the Internet.

Machine Learning can be the application of AI in a way that allows the system to learn for itself through repeated iterations. It can involve the use of algorithms to parse data and learn from it. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Predictive Analytics includes the finding of patterns from data using mathematical models that predict future outcomes. Predictive Analytics encompasses a variety of statistical techniques from data mining, predictive modeling, and machine learning, that analyze current and historical facts to make predictions about future or otherwise unknown events. In business, predictive models exploit patterns found in historical and transactional data to identify risks and opportunities. Models can capture relationships among many factors to allow assessment of risk or potential risk associated with a particular set of conditions, guiding decision-making for candidate transactions.

Single-board microcontroller is a microcontroller built onto a single printed circuit board. This board provides all of the circuitry necessary for a useful control task: a microprocessor, I/O circuits, a clock generator, RAM, stored program memory and any necessary support ICs. The microcontroller can be used by an application developer, without requiring them to spend time and effort to develop controller hardware.

Ultraviolet (UV) is a form of electromagnetic radiation with wavelength from 10 nm (e.g. with a corresponding frequency around 30 PHz) to 400 nm (750 THz), shorter than that of visible light, but longer than X-rays. UV radiation is present in sunlight, and constitutes about 10% of the total electromagnetic radiation output from the Sun.

Example Methods

Figure 1:
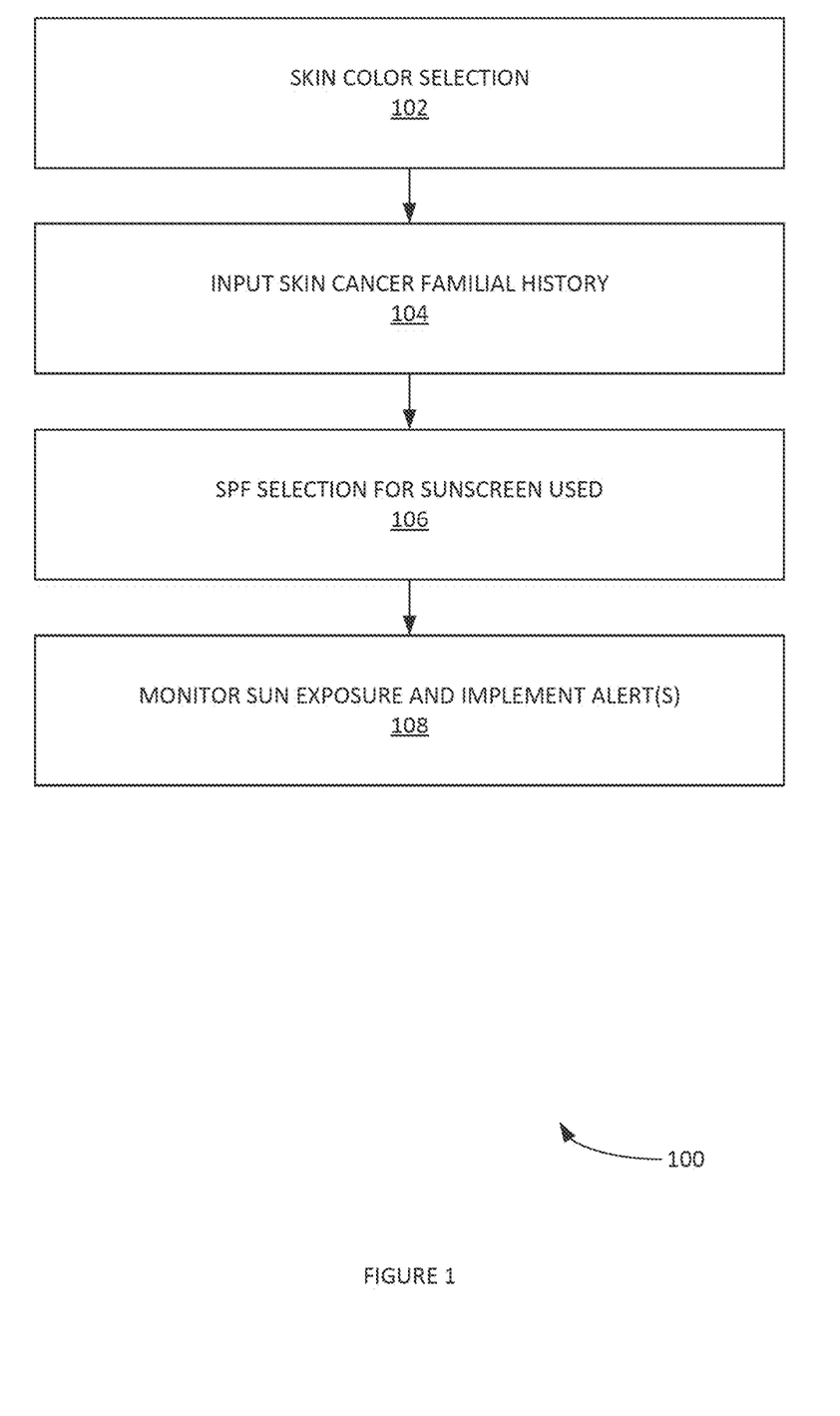
FIG. 1 illustrates an example process for implementing UV exposure monitoring and alerts, according to some embodiments.
Figure 2:
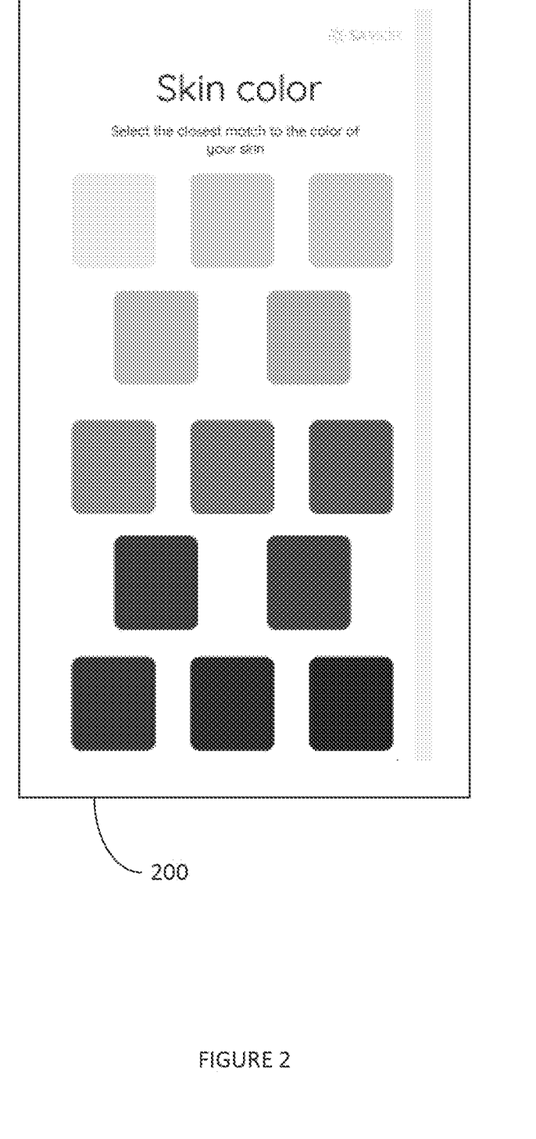
FIG. 2 illustrates an example screen shot of a mobile application that enable a user to make a skin color selection, according to some embodiments.

FIG. 1 illustrates an example process 100 for implementing UV exposure monitoring and alerts, according to some embodiments. In step 102, process 100 can enable a user to make a skin color selection. FIG. 2 illustrates an example screen shot 200 of a mobile application that enables a user to make a skin color selection, according to some embodiments. The user can click to GUI elements of a mobile device application to personalize UV exposure monitoring and alerts. Here, skin color selection can be translated to variable values. For example, process 100 can increase the maximum exposure (maxexposure) by 1* to 13* an original value based on the darkness of the skin.

Figure 3:
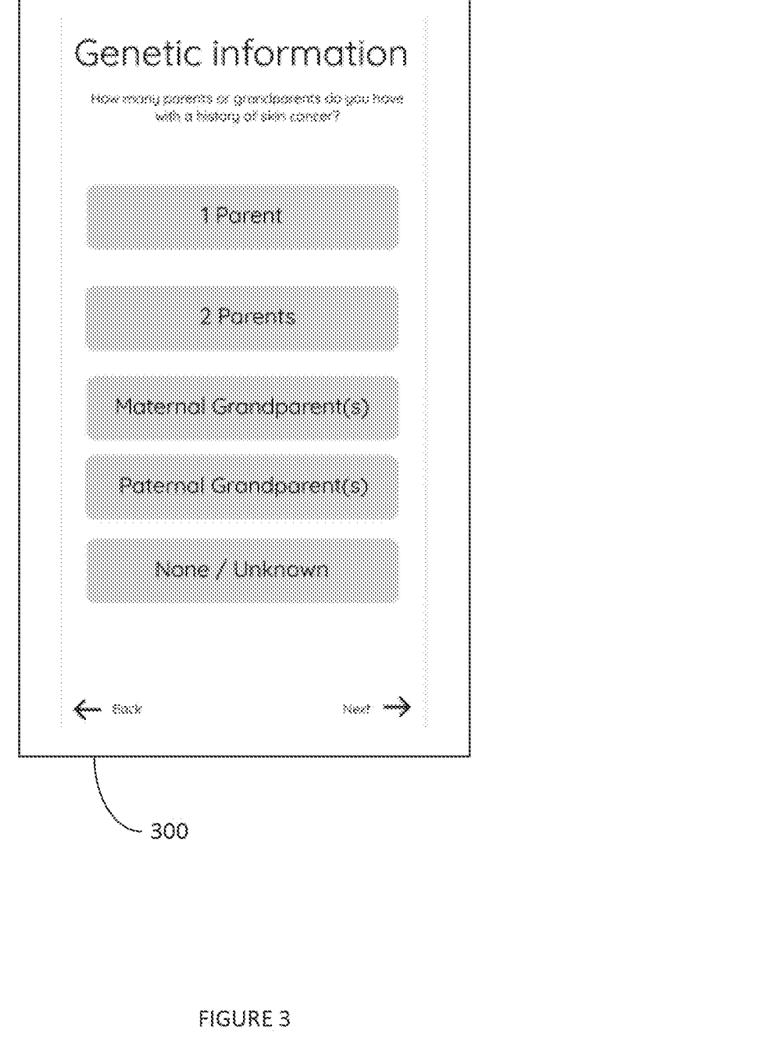
FIG. 3 illustrates an example screen shot of a mobile application that enables a user to input skin cancer familial history, according to some embodiments.

In step 104, process 100 enable a user to input skin cancer familial history. It is noted that other familial and/or personal history questions and inputs can be obtained in step 104. FIG. 3 illustrates an example screen shot 300 of a mobile application that enables a user to input skin cancer familial history, according to some embodiments. Here, the user can select history of skin cancer (e.g. one parent, both parents, maternal grandparents, and/or paternal grandparents). This can decrease the maxexposure value from 1* to 0.8*.

Figure 4:
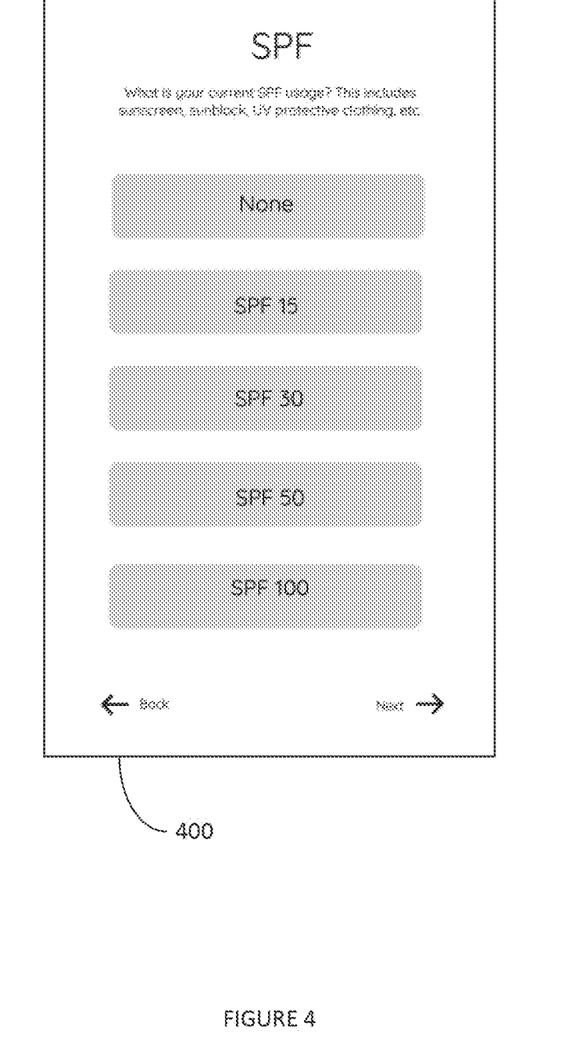
FIG. 4 illustrates an example screen shot of a mobile application that enables a user to input skin cancer familial history, according to some embodiments.

In step 106, process 100 can enable a user to input a sun protection factor (SPF) selection for sunscreen to be/being used. FIG. 4 illustrates an example screen shot 400 of a mobile application that enables a user to input skin cancer familial history, according to some embodiments. This can be an SPF value selection for a sunscreen. This can increase the maxexposure value by 1* to 10*. The application can calculate a maxexposure and sends it to the Bluetooth® module via a wireless connection. Process 100 can then cause the application to display screen shot 500 (e.g. displays maxexposure, current UV index, and an explanation of maxexposure). A Bluetooth® (and/or another wireless network protocol/system) module 604 sends the maxexposure value to an Arduino Uno via physical wiring. Arduino code sets the maxexposure as a variable in its own code Arduino takes a UVI reading from the sensor and sends this to the application and subtracts it from the maxexposure. It is noted that other microcontroller systems can be used in lieu of Arduino Uno (e.g. Raspberry Pi®, etc.).

Figure 5:
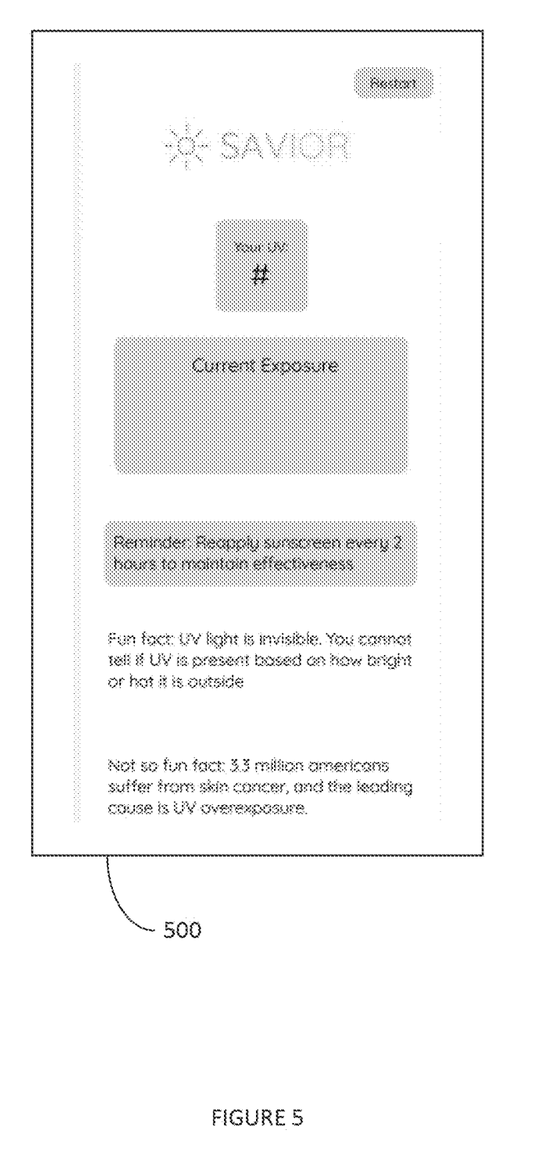
FIG. 5 illustrates an example screen shot of a mobile application that enables a user to input SPF sunscreen information, according to some embodiments.

In step 108, process 100 can monitor sun exposure and implement alert(s). The user can receive a notification on their personal mobile device via the application. The application then displays the UV index. This can be periodically updates (e.g. updates every second, etc.). When the maxexposure value reaches 0, the Arduino Uno relays a message to the application through the Bluetooth® module. After a specified period (e.g. 2 hours) while the loop is still going, the application can send a notification to the user to reapply sunscreen. FIG. 5 illustrates an example screen shot 500 of a mobile application that monitors sun exposure and implements an alert, according to some embodiments.

Example Systems

Figure 6:
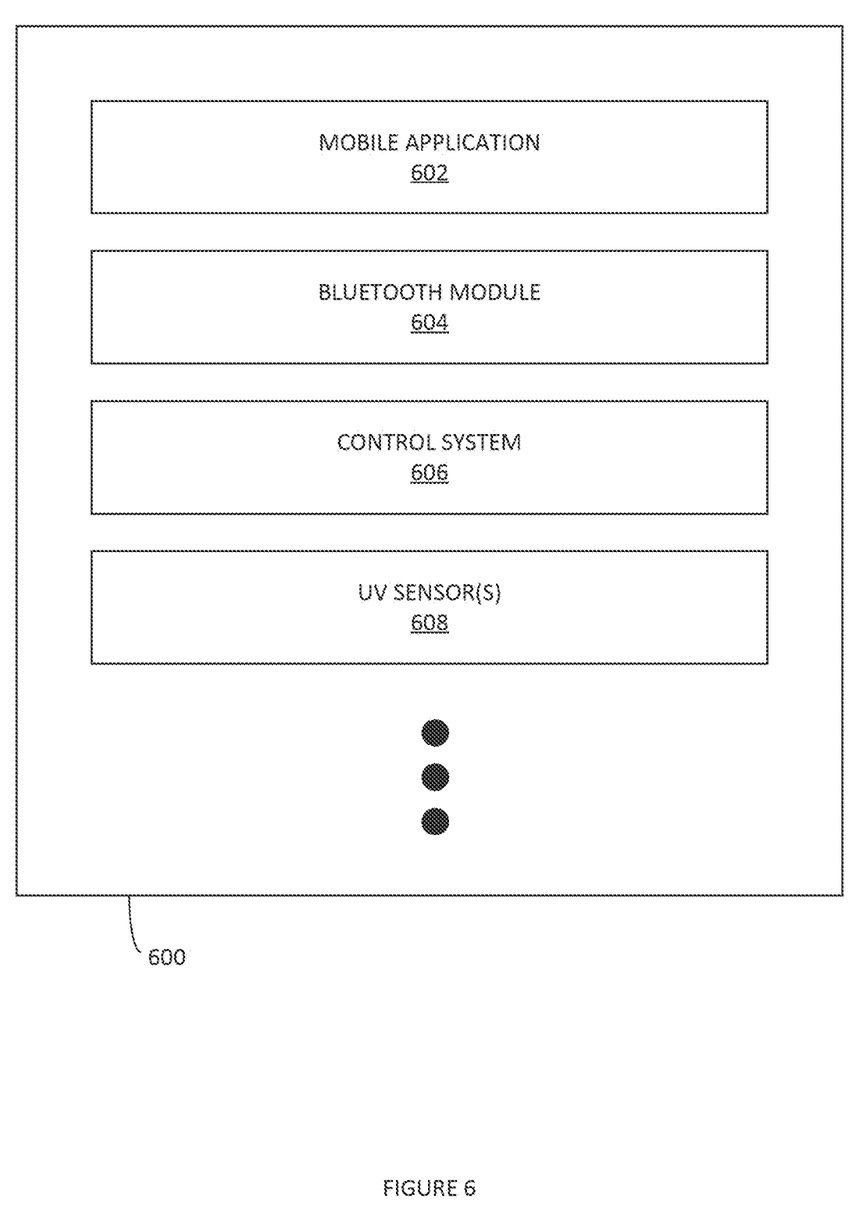
FIG. 6 illustrates an example system for implementing UV exposure monitoring and alerts, according to some embodiments.

FIG. 6 illustrates an example system 600 for implementing UV exposure monitoring and alerts, according to some embodiments. System 600 can be a mobile application 602, web-based application, etc. The mobile application 602 can use a series of personalizations, with each on a different screen to come up with a maxexposure value. In one example, this value starts at 9000, and increases or decreases depending on the personalizations. The personalizations can include, inter alia: skin color, genetic history of skin cancer, and SPF. This value can then be communicated to a control system 606.

In one example, control system 606 can be an Arduino Uno. The Arduino Uno can receive the value(s) via a Bluetooth module 604. When the mobile application 602 has received the signal from the Bluetooth module 604, it can send a notification on the mobile device that the time is up, and that the user should seek safety. In one example, this can be every two (2) hours.

A notification can be sent to the user to reapply sunscreen (if applicable), and a button can be available to the user if reapplied. This can affect the SPF factor if it was applied at the beginning during the personalization.

Bluetooth module 604 can connect with the application's code. Bluetooth module 604 then take the maxexposure value and send it to the Arduino Uno (i.e. control system 606). After receiving the signal from the Uno that the maxexposure value has reached 0, it can relay this to the app. Bluetooth module 604 can send data to mobile device application 602 every second. This can be as part of the loop in the Arduino Code, but the mobile device application 602 may not register anything until the time is finished.

The control module 606 can be/include an Arduino Uno. It is noted that Arduino Uno is a control system. The code written in Arduino IDE is stored in this control system. Control module 606 can receive the personalized maxexposure via the Bluetooth module 604. Control module 606 can then take a UV index reading and subtract this value from the maxexposure every second. For example, maxexposure=9000 and UV index=10, with the time being 900 seconds. This can enable the control module 606 to adapt to changes in the UV index of the user, as it can take a new reading every second. After the maxexposure value reaches 0, control module 606 can send a signal to the Bluetooth module 604.

UV sensor(s) 608 are now discussed. The UV sensor 608 can be controlled by the Arduino Uno. The UV sensor 608 can take readings every second (and/or other specified periodicity) and relay the information to the Arduino Uno. This can be used for the countdown timer in the Arduino IDE code.

System 600 can include other functionalities. System 600 can other users (e.g. not the primary user) to view data from the mobile application 602 to track exposure. For example, doctors can track patient exposure to UV light (e.g. on a real-time and/or historical basis), and assess risks caused by this exposure. System 600 can enable parents track the UV exposure of their children. Parents can view their children's data in order to keep them safe. Employers can use data from system 600 to ensure the safety of employees who may be spending large amounts of time outdoors. System 600 can use a microchip rather than a larger device to increase convenience. System 600 can be configured to be worn on clothing and accessories. System 600 can track the total accumulation over a long period of time and store this as historical data. System 600 can generate a graph tracking total exposure averages daily/weekly/monthly/yearly and let the user have full access to this data. System 600 can include a GPS tracker and/or utilize a user's mobile device's GPS system. System 600 can use this to locate the device. Additionally, current location can be used to obtain a local UV index of a certain area rather than use a sensor. This can also be used to verify sensor accuracy.

Figure 7:
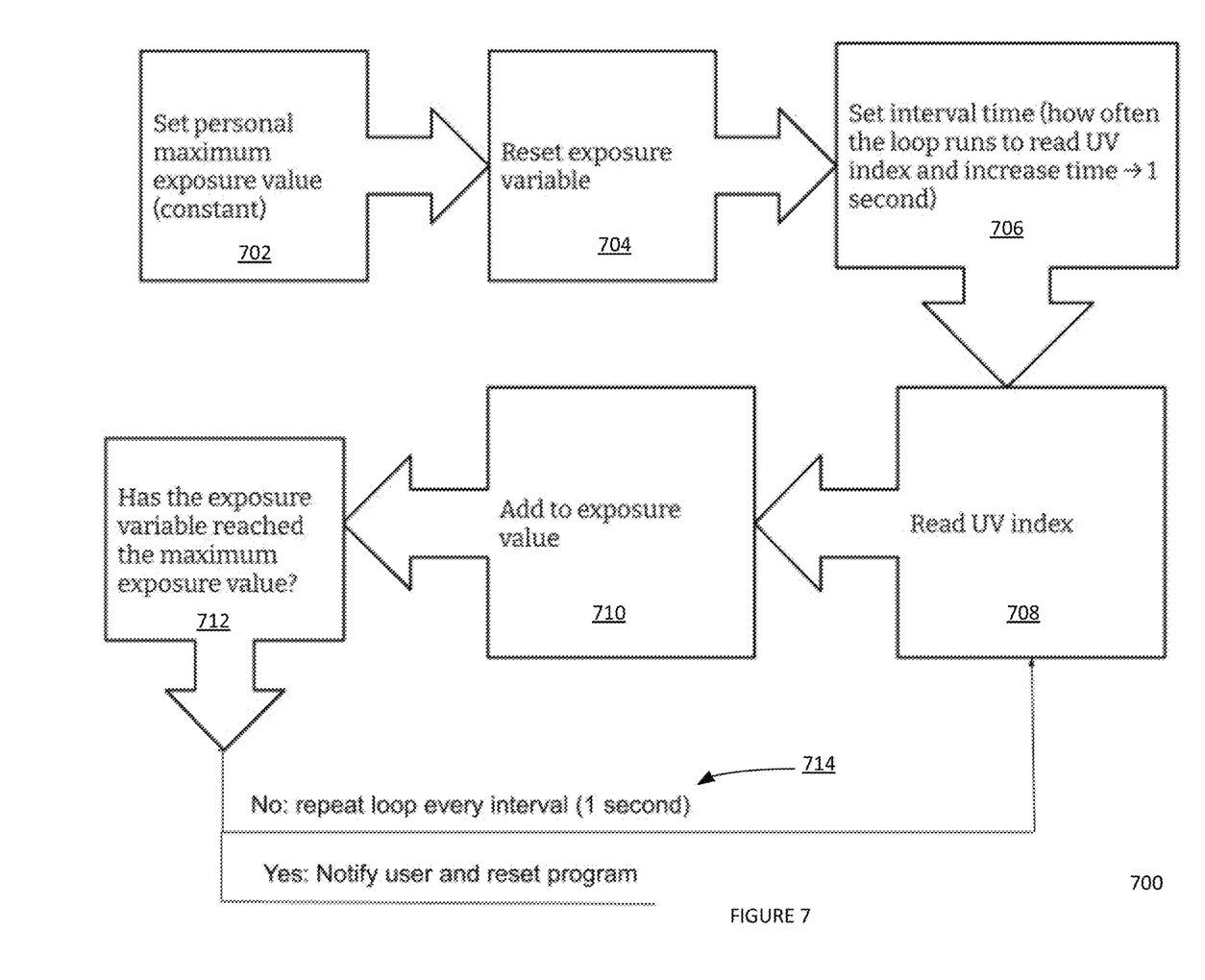
FIG. 7 illustrates an example control system, according to some embodiments.

FIG. 7 illustrates an example process 700, according to some embodiments. In step 702, process 700 can set a personal maximum exposure value. In step 704, process 700 can reset exposure variable. In step 706, process 700 can set the interval time. For example, this can be how often the loop runs to read UV index and increase time (e.g. by one second, etc.). In step 708, process 700 can read the UV index. In step 710, process 700 can add to the exposure value. In step 712, process 700 can determine if the exposure variable has reached the maximum exposure value. In step 714, if no, then process 700 repeats the loop every interval (e.g. one second, etc.). If yes, the process 700 notifies the user and resets program.

Additional Computing Systems

Figure 8:
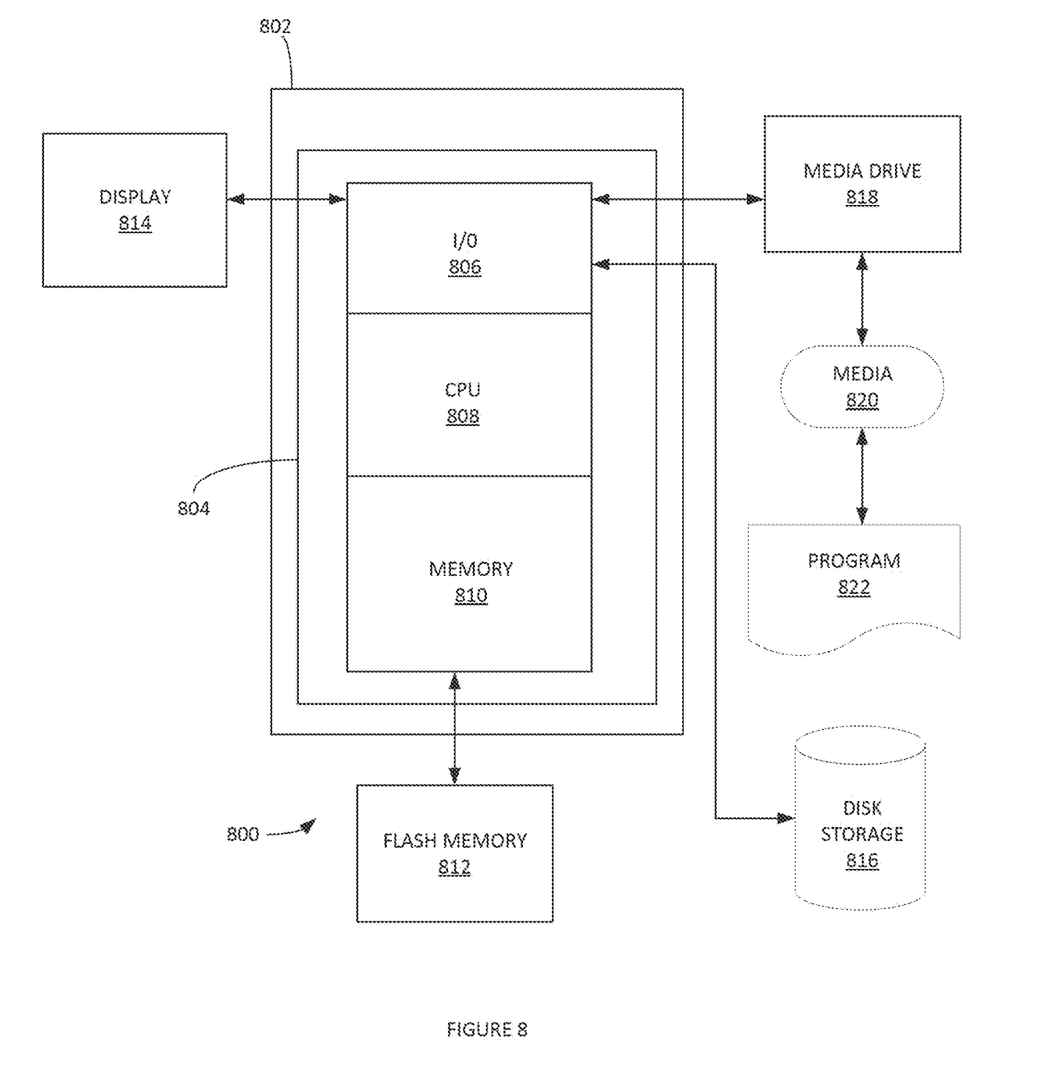
FIG. 8 depicts an example computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or another user input (not shown), a disk storage unit 816, and a media drive unit 818. The media drive unit 818 can read/write a computer-readable medium 820, which can contain programs 822 and/or databases. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Equations and Tables

Figure 9:
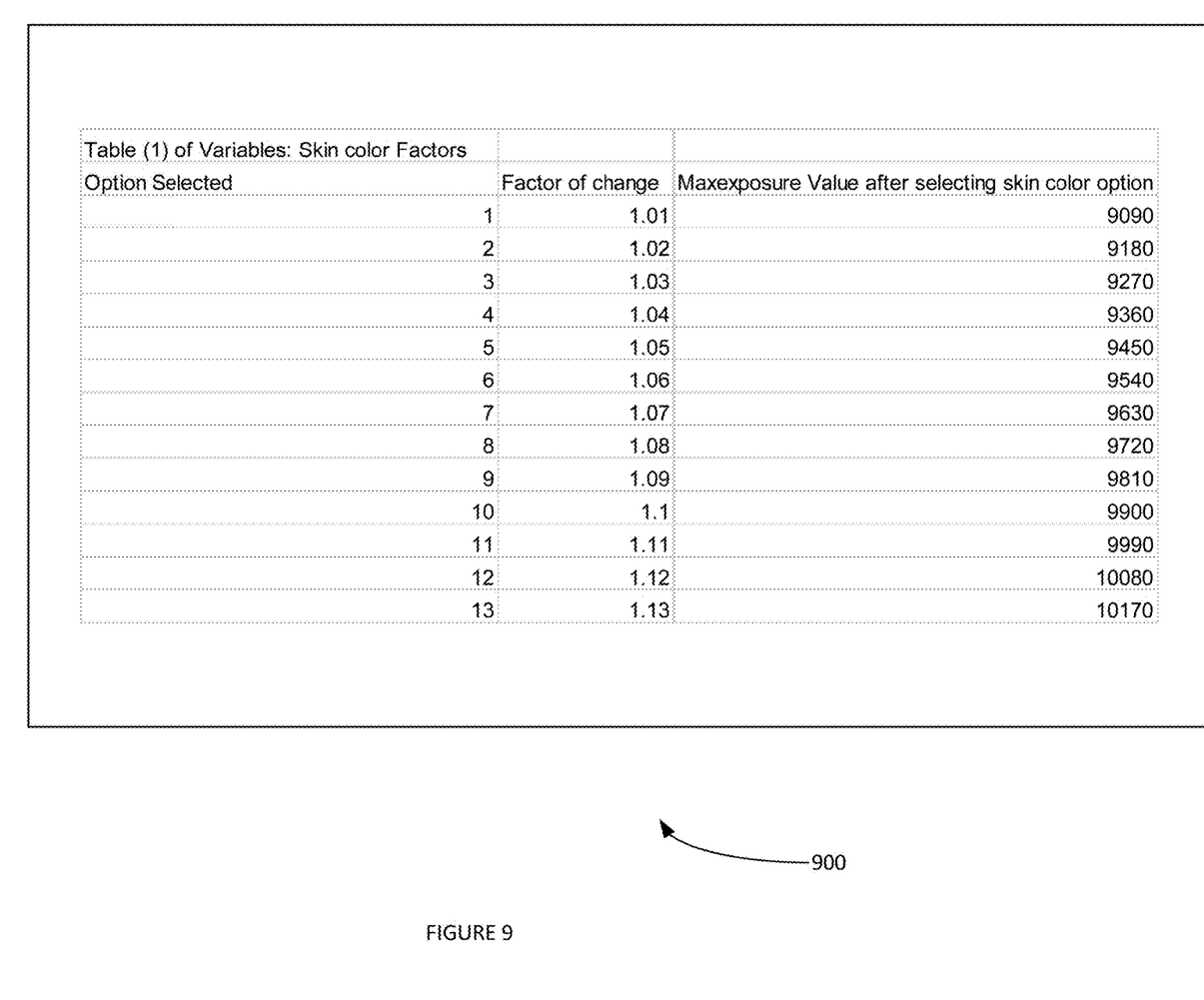
FIGS. 9-11 illustrate a set of example tables that can be utilized by the systems and methods discussed supra, according to some embodiments.
Figure 10:
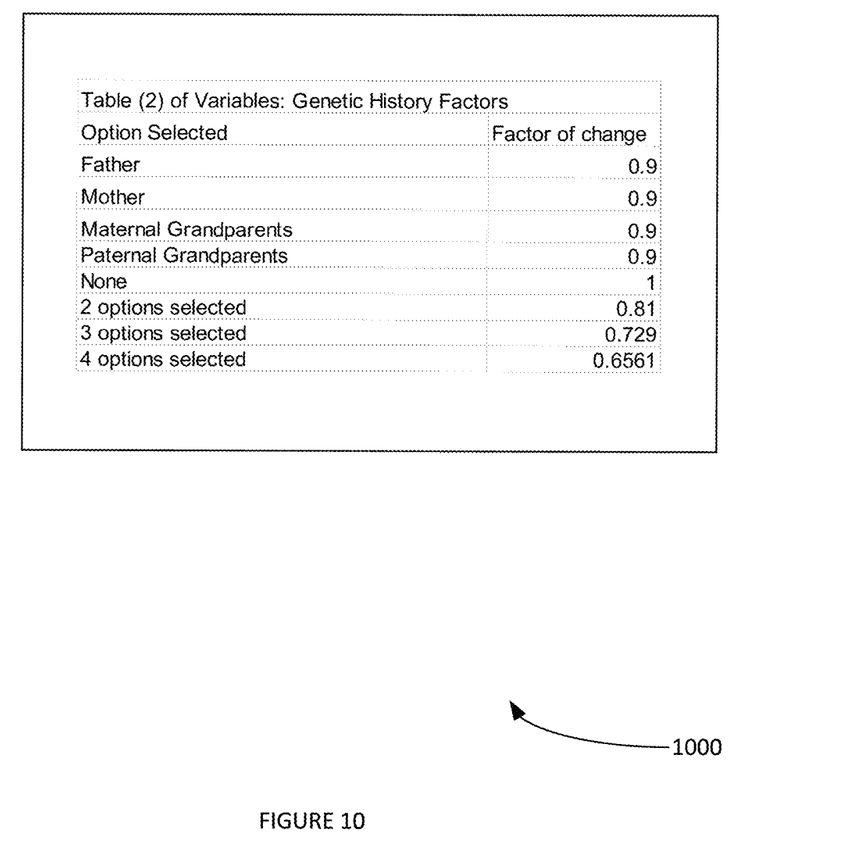
Figure 11:
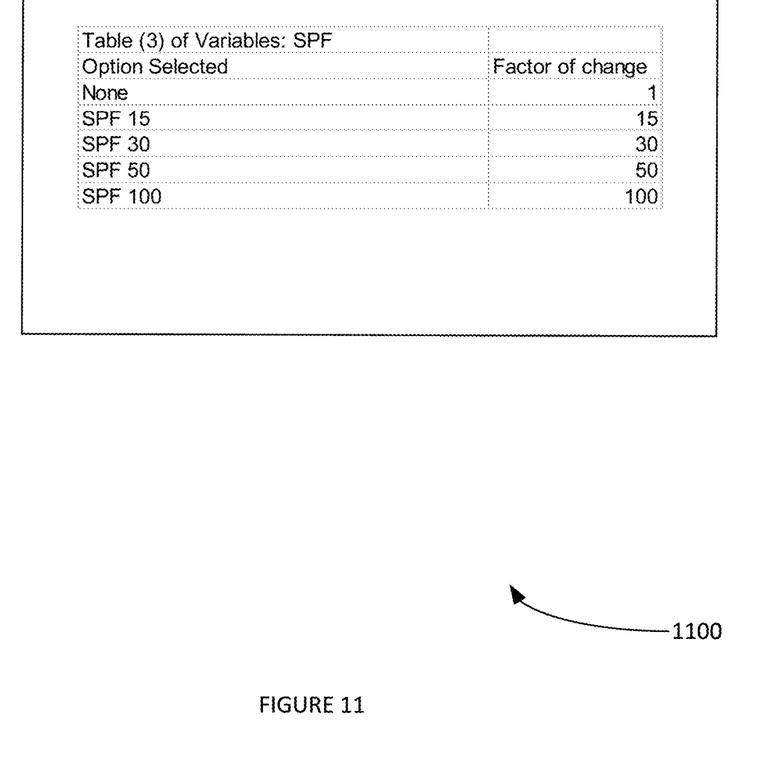

FIGS. 9-11 illustrate a set of example tables 900-1100 that can be utilized by the systems and methods discussed supra, according to some embodiments. Tables 900-1100 can be used to determine a maximum exposure value. In one example, this can be determined with the following equation:

MAXEXPOSURE VALUE=(maxexposure value after selecting skin color option)*Genetic history factor*SPF. This particular equation provides the time in seconds of maximum exposure per twenty-four (24) hour period. This can be further personalized and reset depending on other example input variables in other example embodiments.

More specifically, FIG. 9 illustrates an example table 900 for determine skin color factors, according to some embodiments. Table 900 can be used to determine the 'maxexposure value after selecting skin color option' of the MAXEXPOSURE VALUE equation. The first column has values from 1 to 13. These values can correspond to thirteen grades of skin color ranging from the most pale skin tones to the darkest naturally occurring shade of skin tones. It is noted that other examples can include various intermediary shades with these integer values and shades could be treated as part of a continuum. FIG. 2 illustrates an example set of skin shades that ca be used in obtain data for use in table 900. The second column is a multiplier. It is noted that for each unique shade point, a 1% increase can be applied in terms of the maximum value of UV exposure (e.g. "maxExposure") that can be permitted. The third column include of the maxExposure number. This number starts with a value of 9000 (e.g. a "base maxExposure") and increases as shown in the table from 9090 for value 1 to 10170 for value 13. To calculate the actual time that a user could spend in the sun, a process can first select the row corresponding to the skin color and then divide the maxexposurevalue by the UV index. The maxexposurevalue for 1 is 9090 and if the UV was high (e.g. 10), then the person could only stay exposed for 9090/10=909 seconds or approximately 15 minutes. It is noted that the maxexposurevalue (9090 to 10170) can be computed to be per day. This can be further fine-tuned depending on whether the total exposure occurred all in one session or if the exposure was very brief, in which case it is possible that a process can reset the exposure clock (e.g. with a cool-down time).

FIG. 10 illustrates an example table 1000 for determine genetic history factor, according to some embodiments. Table 1000 can be used to determine the 'Genetic history factor' of the MAXEXPOSURE value equation. In one example, an assumption can be provided that if one of the parents has had skin cancer, then there is a 10% chance of this condition being inherited. Table 1000 incorporates these findings and turned them instead into the percent by which the MAXEXPOSURE can be decreased in order to account for these hereditary impacts. For example, if one parent (e.g. father or mother) had skin cancer, then our algorithm would reduce the MAXEXPOSURE by 10%. If both parents had skin cancer, then the reduction applied by the algorithm can be 19%. Other values for up to two generations are expressed in the table.

FIG. 11 illustrates an example table 1100 for determine SPF factor, according to some embodiments. Table 1100 can be used to determine the 'SPF factor' of the MAXEXPOSURE VALUE equation. This represents the total SPF. Although table 1100 represents an example of common SPF values for sunscreen, other versions of table 1100 can view SPF values as a continuum from 1 (no SPF protection/bare skin) to 100 (complete protection). Table 1100 can include various key assumptions on SPF. This can include that the SPF lasts for a maximum of two (2) hours at one hundred percent (100%) of its rated level of protection. In one example, the SPF factor can be set to decline at a specified rate after a specified time. For example, after two (2) hours, the sunscreen factor can be set to exponentially decline (by way of example): $y=-spf(x-4)+spf$. This equation is provided by way of example and not of limitation. Other values then 4 can be utilized in the exponent. Given the data range of SPF of one to one hundred (1 to 100), this equation can reach value zero at five (5) hours, no matter the SPF value. Degradation can start immediately after the 2-hour point and the steepness of degradation and time will vary depending on SPF value.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:
1. A computerized system comprising:
   at least one computer processor:
   a user-interface configured to:
      display a skin color selection, wherein the skin color selection comprises a plurality of skin pigments,
      receive a user skin color selection,
      display a skin cancer familial history input field,
      receive a skin cancer familial history input value,
      display a sun protection factor (SPF) input field, and
      receive a SPF sunscreen input value selection for sunscreen being used;
   a sun exposure monitoring application operating in the computer system configured to:
      translate the skin color selection to a maxim sun exposure value, and
      compute a maximum sun exposure time using the user skin color selection, the skin cancer familial history input value, and the SPF selection for a sunscreen being used,
      monitor a sun exposure of the computer system,
      implement an alert signal when the maximum sun exposure time is reached; and
   an ultraviolet light sensor coupled with the computing system configured to:
      periodically receive a UV value and translate the UV value to a computer readable UV value and communicate the computer readable UV value to the sun exposure monitoring application,
   wherein the maximum sun exposure time (maxexposure) is calculated by the equation:
      (maxexposure) by 1 times (*) to 13* an original value based on the skin color selection, wherein the maximum sun exposure time is increased by multiplying SPF value selection for the sunscreen by a value of 1* to 10*, wherein sun exposure monitoring application displays the current maxexposure and a current UV index, wherein the maximum sun exposure time is calculated using a specific multiplication factor ranging from 1 to 13 applied to a base value determined by the user's skin color selection according to a predefined skin color table, and wherein the skin cancer familial history input value is a weighted factor that reduces the maximum sun exposure time according to a predefined table of familial risk factors, wherein the sun exposure monitoring application is configured to extend the maximum sun exposure time by a calculated amount based on the SPF value when the sunscreen has been reapplied, and to provide a new countdown alert for the extended maximum exposure time, wherein the sun exposure monitoring application displays an explanation of a value of maximum sun exposure time (maxexposure), and wherein the sun exposure monitoring application displays a reapply sunscreen alert after a specified period of time wherein the sun exposure monitoring application adds a specified time amount to the maxexposure value after the sun exposure monitoring application receives an indication the sunscreen has been reapplied.

2. The computerized system of claim 1, wherein the sun exposure monitoring application obtains a computer readable UV value for a period of time from a third-party weather service server system.

3. The computerized system of claim 1, wherein the sun exposure monitoring is operative in a mobile device.

4. The computerized system of claim 1, wherein the user interface is displayed on a touch screen of the mobile device.

5. The computerized system of claim 1, wherein the maxexposure value is counted down and the alert signal is generated when maxexposure value=0.

* * * * *